(12) United States Patent
Banerjee

(10) Patent No.: US 11,507,112 B2
(45) Date of Patent: Nov. 22, 2022

(54) CONTROL OF A TRANSPORTATION VEHICLE

(71) Applicant: ZF Friedrichshafen AG, Friedrichshafen (DE)

(72) Inventor: Alexander Banerjee, Oberteuringen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 186 days.

(21) Appl. No.: 16/639,478

(22) PCT Filed: Jul. 20, 2018

(86) PCT No.: PCT/EP2018/069718
§ 371 (c)(1),
(2) Date: Feb. 14, 2020

(87) PCT Pub. No.: WO2019/034365
PCT Pub. Date: Feb. 21, 2019

(65) Prior Publication Data
US 2021/0132631 A1    May 6, 2021

(30) Foreign Application Priority Data
Aug. 15, 2017 (DE) .................. 10 2017 214 185.9

(51) Int. Cl.
G05D 1/02 (2020.01)
G05D 1/00 (2006.01)

(52) U.S. Cl.
CPC ......... G05D 1/0295 (2013.01); G05D 1/0088 (2013.01); G05D 1/0094 (2013.01); G05D 1/0225 (2013.01)

(58) Field of Classification Search
CPC .. G05D 1/0295; G05D 1/0088; G05D 1/0094; G05D 1/0225
See application file for complete search history.

(56) References Cited

U.S. PATENT DOCUMENTS

| | | | |
|---|---|---|---|
| 9,056,676 | B1 | 6/2015 | Wang |
| 2017/0038779 | A1 | 2/2017 | Fujimori |
| 2018/0200745 | A1* | 7/2018 | Dudar ................... B05B 12/004 |
| 2018/0251153 | A1* | 9/2018 | Li ............................ B60D 1/62 |

(Continued)

FOREIGN PATENT DOCUMENTS

| | | |
|---|---|---|
| DE | 3822120 A1 | 2/1990 |
| DE | 202009011377 | 8/2010 |
| DE | 102011085019 A1 | 4/2012 |

(Continued)

OTHER PUBLICATIONS

Search Report issued in German Patent Application No. DE 10 2017 214 185.9 dated Apr. 30, 2018 (10 pages).

(Continued)

*Primary Examiner* — Michael D Lang
(74) *Attorney, Agent, or Firm* — Crowell & Moring LLP

(57) ABSTRACT

A control system for a transportation vehicle comprises a sensor vehicle that has at least one sensor for scanning an environment, wherein the sensor vehicle is configured to move autonomously to the detected transportation vehicle, and a control unit for controlling the transportation vehicle on the basis of sensor data from the at least one sensor.

15 Claims, 3 Drawing Sheets

(56) References Cited

U.S. PATENT DOCUMENTS

2019/0236853 A1\* 8/2019 Vander Helm ........ G08G 1/146

FOREIGN PATENT DOCUMENTS

| DE | 102014007245 A1 | 11/2014 | | |
|----|----|----|----|----|
| DE | 102015001362 A1 | 8/2015 | | |
| DE | 102015206844 | 11/2015 | | |
| DE | 102014224099 A1 | 6/2016 | | |
| DE | 102015012369 | 10/2016 | | |
| DE | 102015207979 | 11/2016 | | |
| DE | 102015111141 A1 | 1/2017 | | |
| DE | 202017101730 U1 | 7/2017 | | |
| DE | 102017214185 A1 | 2/2019 | | |
| FR | 2986647 | 8/2013 | | |
| GB | 2533140 | 6/2016 | | |
| JP | 2006180326 | 7/2006 | | |
| JP | 2007233771 A | 9/2007 | | |
| KR | 20160137442 A | \* | 11/2016 | ............. B60R 1/081 |
| KR | 20170022357 | 3/2017 | | |
| WO | WO 2019/034365 A1 | 2/2019 | | |

OTHER PUBLICATIONS

SAE_J3016A_ Taxonomy and Definitions for Terms Related to Driving Automation Systems for On-Road Motor Vehicles—SAE International (http://standards.sae.org/j3016_201609) (30 pages).
Written Opinion of the ISR in PCT/EP2018/069718 dated Feb. 21, 2019 (9 pages in German).

\* cited by examiner

CONTROL OF A TRANSPORTATION VEHICLE

CROSS-REFERENCE TO RELATED APPLICATIONS

This application is a U.S. national stage application under 35 U.S.C. § 371 of PCT Application No. PCT/EP2018/069718, filed on Jul. 20, 2018, and published as WO 2019/034365 A1 on Feb. 21, 2019, which claimed priority from German Application No. DE 10 2017 214 185.9, filed on Aug. 15, 2017, the entirety of which are each hereby fully incorporated by reference herein.

The present invention relates to the control of a transportation vehicle. In particular, the invention relates to the control of a system and a method for controlling the transportation vehicle.

A transportation vehicle, in particular a truck, transports objects on a public road network. In order to be able to autonomously control the transportation vehicle, thus to provide a control that no longer requires human monitoring or human intervention, numerous sensors for scanning an environment and an effective processor are necessary. According to the current prior art, a completely autonomous control of the transportation vehicle with sufficient operational safety during unanticipated events is not yet possible.

At the start or end of a drive, the transportation vehicle may drive through a depot. There may be other rules there than in public road traffic, and other road users may comprise special vehicles or vehicles with special rights. The objective of autonomous control of the transportation vehicle may be more complicated as a result.

DE 10 2015 001 362 A1 proposes a technology for automatically positioning swap bodies. In this case, a flatbed truck drives under a swap body, lifts it up, moves it, and lowers it again.

One of the fundamental objects of the present invention is to create an improved technology for controlling a transportation vehicle that can be implemented in particular in a depot or a similar closed road network. The invention achieves this by means of the subject matter of the independent claims. Dependent claims describe preferred embodiments.

A control system for a transportation vehicle comprises a sensor vehicle that has at least one sensor for scanning an environment, wherein the sensor vehicle is configured to autonomously move a detected transportation vehicle, and the control system comprises a control unit for controlling the transportation vehicle based on sensor data from the at least one sensor.

The sensor vehicle can be an air vehicle, e.g. a multirotor helicopter or some other type of drone, or a land vehicle, in particular a type of small automobile. The sensor vehicle is equipped with one or more sensors, which can comprise, in particular, a position sensor, radar sensor, lidar sensor, camera, ultrasound sensor, movement sensor, temperature sensor, sound sensor, or some other type of sensor. When swapping out sensors from the transportation vehicle on the sensor vehicle, the transportation vehicle can remain substantially unchanged. The sensors on board the sensor vehicle can be used in conjunction with various transportation vehicles, such that cost benefits can be obtained on the whole via an increased utilization of the sensors. Furthermore, the sensors can be adapted to special requirements regarding the control system. If, for example, the road lanes are well marked in the range of the control system, a camera can be optimized with respect to its resolution, contrast, luminosity, or imaging speed, specifically with regard to scanning these markings.

The control system is normally limited to a predetermined area, normally excluding public traffic, e.g. in a mine, a depot, a practice or testing area, etc. The control system can comprise a parking space for parking the transportation vehicle until the sensor vehicle reaches the transportation vehicle, and a target position, at which the transportation vehicle is controlled. The control of the transportation vehicle generally comprises a longitudinal and/or lateral control. By way of example, the control system can comprise a closed area, e.g. a depot or a testing ground. The transportation vehicle can be used to transport goods to or from the closed area. The transportation vehicle can be parked in the parking space for this, from where an autonomous control can take place, e.g. to a loading ramp or a warehouse, using the sensor vehicle. Locating the correct target position, selecting a route to this target position, and guiding the transportation vehicle to the target position can be automated. Errors can be minimized, such that the time the transport vehicle spends in the range of the control system can be more efficiently used. After loading or unloading, the transportation vehicle can also be returned to the parking space in a corresponding manner, with the support of the sensor vehicle. It is also possible to pilot the vehicle successively to numerous target positions within the range of the control system.

The transportation vehicle can have at least one other sensor for scanning an environment, wherein the control system also comprises an interface for connecting to the other sensor, and the control unit is configured to control the vehicle based on sensor data from the other sensor. As a result, one or more sensors on board the transportation vehicle, e.g. a front or rear camera, can thus be advantageously used therewith. Other sensors, which indicate an internal state of the transportation vehicle, for example, e.g. an interior temperature of a cargo hold or the charging state of an energy store for locomotion, can thus be taken into account. In another embodiment, sensor data can also be used from a permanently installed sensor in the sensor system, e.g. a tower camera or an access control system. In general, the control of the transportation vehicle can be improved in that as many different data sources as possible can be used.

The transportation vehicle can comprise a drive system, wherein the control system comprises an interface for transmitting control information to the drive system. By way of example, the transportation vehicle can comprise a truck with a drive motor. The control of the transportation vehicle is preferably implemented in that corresponding control information is transmitted to the drive system via the interface. In one embodiment, the transportation vehicle is directly controlled by means of an on-board control unit. In another embodiment, the transportation vehicle comprises an intermediary computer, e.g. a so-called "Openmatics Box," via which it is possible to transmit control information indirectly.

In another embodiment, the transportation vehicle does not have a drive, i.e. it can be a trailer or a flatbed for a towing vehicle. The control system can comprise a towing vehicle for moving the transportation vehicle, wherein the towing vehicle is configured to autonomously couple to the transportation vehicle. In other words, a towing vehicle can be used to control a passive transportation vehicle, driving the transportation vehicle within the range of the control system. The towing vehicle can be in the form of a shunting engine or an aircraft tug for shunting or otherwise driving the transportation vehicle.

The sensor vehicle is particularly preferably configured to bring the transportation vehicle to a position autonomously. By way of example, a transportation vehicle capable of flight, e.g. in the form of a multirotor helicopter, can land on the roof of the transportation vehicle or towing vehicle. A ground supported sensor vehicle can connect to the transportation vehicle at the bottom, front, back or side, for example. The evaluation of the sensor values from sensors in the sensor vehicle can be facilitated by the fixed physical coupling to the transportation vehicle. In another embodiment one or more sensor vehicles can additionally or alternatively accompany the transportation vehicle at a distance, not coupled thereto. By way of example, the sensor vehicle can remain within a predetermined maximum distance to the transportation vehicle. As a result, the sensor vehicle can more easily assume a position in relation to the transportation vehicle, from where it is easier to better scan the environment.

A method for controlling a transportation vehicle comprises steps for detecting the transportation vehicle; moving a sensor vehicle to the transportation vehicle, wherein the sensor vehicle has at least one sensor for scanning an environment of the transportation vehicle, and the sensor vehicle is configure to autonomously move the detected vehicle; and controlling the transportation vehicle based on sensor data from the at least one sensor.

The method can be carried out by means of one or more control units. A control unit can be installed at different locations, as explained above. One of the control units can comprise a programmable microcomputer in particular. One of the control units can be configured to execute the method described herein, in its entirety or in part. The corresponding method parts can take the form of a computer program with program code elements. Advantages or features of the method can be applied to the control system, or vice versa.

The invention shall now be described in greater detail in reference to the attached drawings. Therein:

Figure 1:
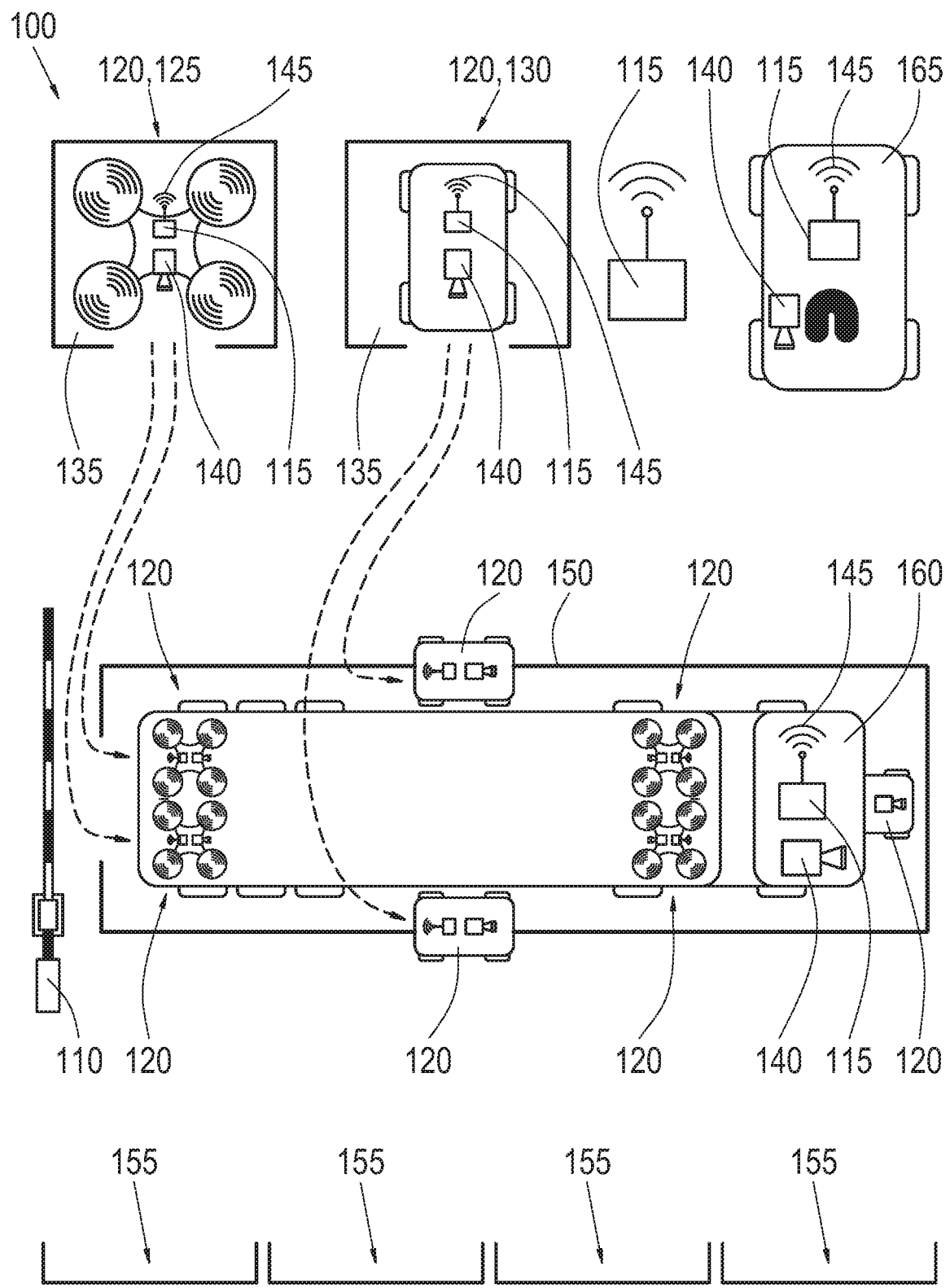
FIG. 1 shows an exemplary control system for a transportation vehicle.

FIG. 1 shows a control system 100 for a transportation vehicle 105. The control system 100 is configured to control or move the transportation vehicle 105 autonomously, i.e. without the need for human monitoring or intervention. With respect to SAE J3016, a level 2 control or higher is preferred, ideally level 4 or level 5. The control of the transportation vehicle 105 is preferably limited to a predetermined area, which equates to the range of the control system 100. The area can be a depot, for example, or a private property, a military barracks, or some other site that can be geographically delimited. The area is preferably physically delimited from an exterior in which typical street traffic can take place, or it can be delimited therefrom by means of an access system. The boundary of the control system 100 is symbolically indicated in FIG. 1 by a barrier 110. Controlled by the barrier 110, the transportation vehicle 105 can enter or exit road traffic within the range of the control system 100.

It has been acknowledged that when controlling the transportation vehicle 105 within the range of the control system 100, a system knowledge is necessary, based on which knowledge of the public road traffic is only available to a limited extent. By way of example, there may be rules within the range control system 100 that differ from the rules for general road traffic. It is also advantageous to have knowledge of as many traffic maneuvers as possible that take place or are planned within the range of the control system 100, in order to be able to better control the transportation vehicle 105. The applicable rules and/or the traffic maneuvers within the range of the control system 100 may be known to a control unit 115, for example, which is stationary in FIG. 1.

It is also proposed that the guidance of the transportation vehicle 105 is based on sensor signals from a larger number of sensors than are normally provided on board the transportation vehicle 105. For this, one or more sensor vehicles 120 are temporarily moved to the transportation vehicle 105, in order to facilitate the control thereof. These can be a sensor vehicle 125 capable of flight, e.g. a multirotor helicopter (a helicopter with numerous rotors) and/or a sensor vehicle 13 that can be driven on land, e.g. an automobile. The sensor vehicle 120 is preferably significantly smaller than the transportation vehicle 105. Because the payload of the sensor vehicle 120 does not need to be very large, the sensor vehicle 120 can be small, such that it can fit within a preferably cube-shaped volume of e.g. ca. 1 $m^3$ or 0.5 $m^3$. The sensor vehicle 120 can have practically any size, as long as it can still be driven or flown sufficiently safely and reliably.

Preferably, a number of sensor vehicles 120 are available within the range of the control system 100, and each sensor vehicle 120 can be conveyed to the transportation vehicle 105. Inactive sensor vehicles 120 can be parked at a predetermined standby location 135, where they can supplement their energy store, for example. There can also be numerous standby locations 135 within the range of the control system 100.

Each sensor vehicle 120 comprises at least one sensor 140 and preferably a wireless communication system 145. The sensor 140 is configured to scan an environment of the sensor vehicle 120 and thus the environment of the transportation vehicle 105, when the sensor vehicle 120 is in the vicinity thereof. The scanning can take place optically, in particular, by means of radar or lidar. The sensor 140 can also be configured to obtain other information, e.g. a position, speed, or acceleration of the sensor vehicle 120. The sensor vehicle 120 preferably comprises numerous sensors 140, which are configured to obtain different information, or the same information in different directions or at different distances.

The transportation vehicle 105 can likewise comprise a control unit 115, preferably a wireless interface 145, and/or one or more sensors 140. Recorded sensor data can be locally processed in the sensor vehicle 120 as well as in the transportation vehicle 105, and/or transmitted to another location. The control units 115 are normally in the form of microcomputers, microcomputer systems, or microcontrollers.

A distributed determination, by means of numerous control units 115, or a central determination, by means of just one control unit 115, can be carried out to determine control signals for the drive system 160. Sensor data from the sensors 140 can be acquired, fused, or compared with one another in a raw, partially processed, or processed form for this. Control signals can be provided on the additional basis of current information regarding a traffic incident within the range of the control system 100. Such information can comprise, e.g. a planned or occurring transportation on the site, positions, speeds or directions of movement of one or more transportation vehicles 105, or information, based on which a target position can be determined. This information is normally available in the stationary control unit 115, or can be obtained therewith, by querying a management system.

The control unit 115 on board the transportation vehicle 105 can also be configured to receive and forward control commands to a drive system 160, which can be comprised in the transportation vehicle 105.

If the transportation vehicle 105 does not have a drive system 160, the sensor 140, control unit 115, and/or communication system 145 can still be attached to the drive-less transportation vehicle 105. If a drive system 160 of the transportation vehicle 105 cannot or is not used for moving the transportation vehicle 105, or the transportation vehicle 105 does not have a drive, the control system 100 can comprise a towing vehicle 165, which can couple to the transportation vehicle 105 and move it. There is preferably at least one further sensor 140 on board the towing vehicle 165, a preferably wireless communication system 145, and optionally, a control unit 115. Sensor data from the sensor 140 attached to the towing vehicle 165 can likewise be used for controlling or monitoring the transportation vehicle 105.

The transportation vehicle 105 is preferably autonomously controlled between a starting position and a target position. In the example depicted herein, the transportation vehicle 105 is parked in a parking space 150, by way of example, to which the transportation vehicle 105 can be driven manually from outside the control system 100 when the barrier 110 is open. By way of example, the target position for the transportation vehicle 105 is a predetermined loading ramp 155. The transportation vehicle 105 can be loaded or unloaded there, after which it can then be moved to another target position, e.g. another loading ramp 155 or the parking space 150. The transportation vehicle 105 can then be driven outside the control system 100 from the parking space 150, e.g. by a driver. This procedure is described below in greater detail in reference to FIG. 3.

Figure 2:
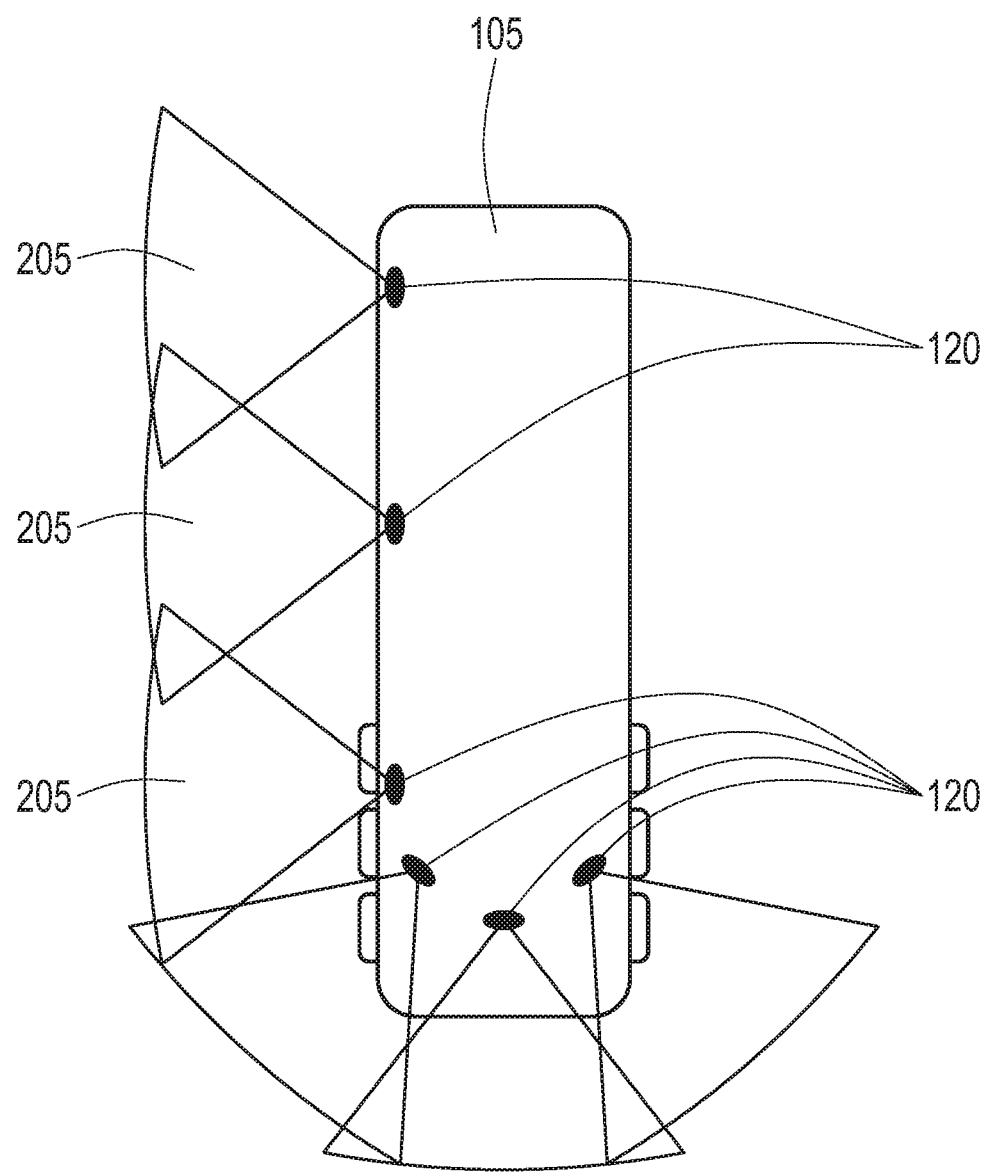
FIG. 2 shows a transportation vehicle with exemplary sensor vehicles.

FIG. 2 shows an exemplary transportation vehicle 105 with numerous exemplary sensor vehicles 120. By way of example, the transportation vehicle 105 does not have a drive in FIG. 2, and is in the form of a flatbed trailer. There are numerous sensor vehicles 120 in the vicinity of the transportation vehicle 105. It is preferred that at least one of the sensor vehicles 120 is in an elevated position, e.g. on a roof of the transportation vehicle 105. The sensor vehicles 120 can be retained on the transportation vehicle 105 by means of suction cups, form-fitting couplings, or solely by gravity. One or more sensor vehicles 120 can also remain at a predetermined distance to the transportation vehicle 105 without contact thereto.

Each sensor 140 can be assigned a scanning range 205, wherein the scanning ranges 205 of different sensors 140 can also overlap. The positions of the sensor vehicles 120 in relation to the transportation vehicle 105 are preferably such that within a predetermined range, and at least within a predetermined direction—preferably 360°—it is possible to fully scan the environment.

Figure 3:
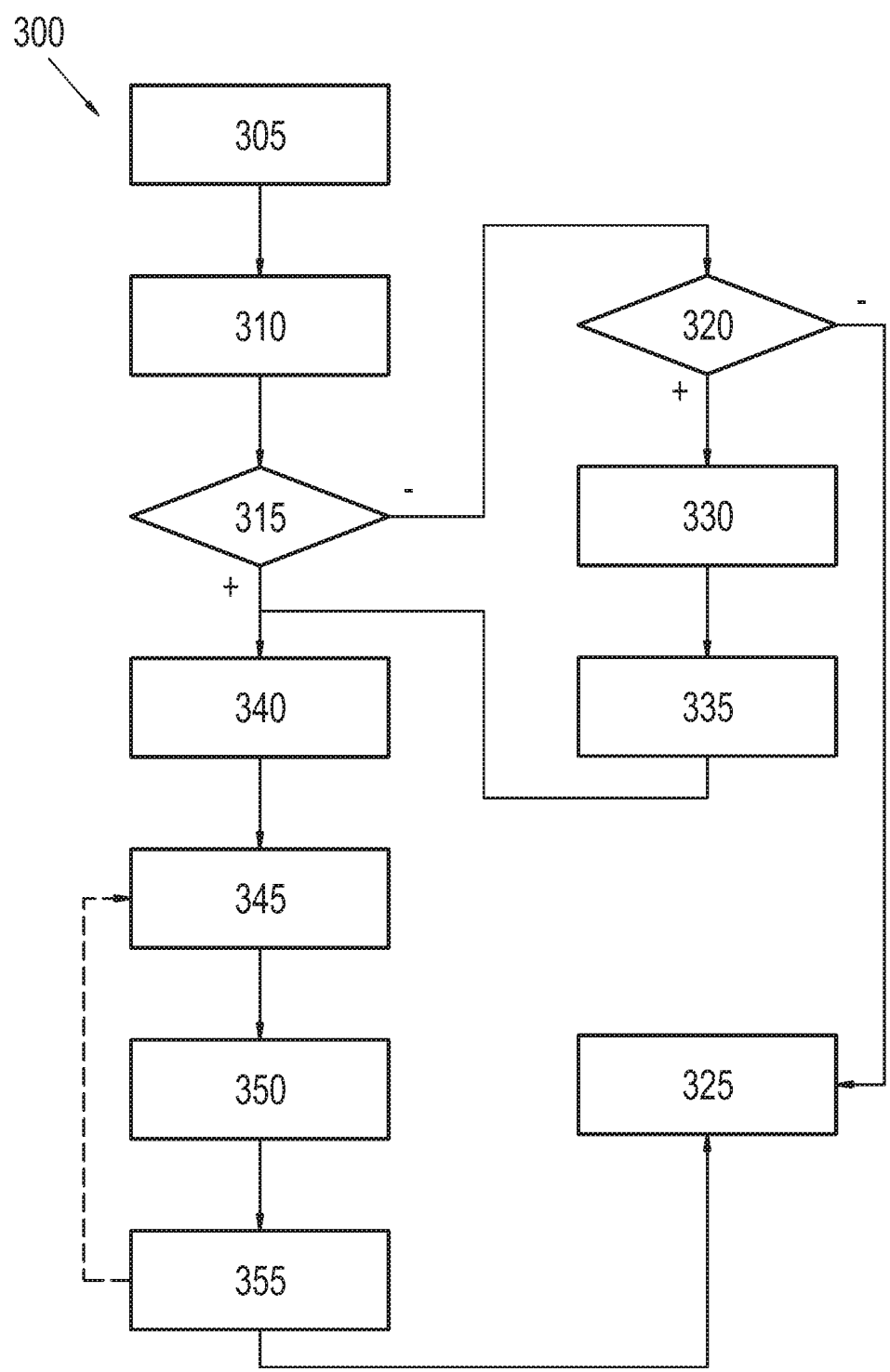
FIG. 3 shows a flow chart for a method for controlling a transportation vehicle.

FIG. 3 shows a flow chart for a method 300 for controlling a transportation vehicle such as the transportation vehicle 105 in the control system 100 shown in FIG. 1. The method 300 can be partially or entirely executed on one or more control units 115 in the control system 100, or the transportation vehicle 105.

In an optional step 305, adapted to the control system 100 in FIG. 1, the transportation vehicle 105 arrives in a predetermined location or region covered by the control system 100. In particular, the transportation vehicle 105 can be parked in a parking space 150. After the transportation vehicle 105 has entered the range of the control system 100, the barrier 110 or another access control system in the area can be closed.

The transportation vehicle 105 is detected in step 310. In particular, the transportation vehicle 105 can be identified in order to later be able to determine how the transportation vehicle 105 is to be moved within the range of the control system 100.

It can be determined in step 315 whether there is a drive system 160 that can be used for controlling the transportation vehicle 105 based on external control data. If the method 300 is executed by the control unit 115 on board the drive system 160, there is no need for this test.

If there is no direct possibility for remote control, it can be checked in step 320 whether the drive system 160 can be decoupled from the rest of the transportation vehicle 105. If this is not the case, the method 300 can be terminated in step 325. Otherwise, the drive system 160 can be decoupled in step 330, and a towing vehicle 165 can be coupled to the transportation vehicle 105 in step 335. For this, a towing vehicle 165 can be selected from numerous towing vehicles 165 that may be within the range of the control system 100.

One or more sensor vehicles 120 present in the range of the control system 100 can be selected in step 340, and caused to approach the transportation vehicle 105. Preferably, at least a portion of the sensor vehicles 120 are physically attached to the transportation vehicle 105.

Optional, as well as further, information, e.g. a target position 155 and preferably a route to the target position 155, can also be determined in step 345, in particular based on an identification of the transport vehicle 105. Traffic data within the range of the control system 100 or information regarding planned further transport within the range of the control system 100, for example, can also be used for both determinations.

The transportation vehicle 105 is autonomously moved to the target position 155 in step 350. In the present context, autonomous means that there is a completely autonomous control, which is not, however, necessarily limited to local information sources or processors. A collaborative execution on numerous, physically separate control units 115 that can nevertheless be connected to one another by means of preferably wireless communication systems 145, is preferred.

Optionally, the transportation vehicle 105 can be loaded or unloaded in step 355. This means that one or more objects can be brought on board the transportation vehicle 105, or removed therefrom.

Subsequently, the transportation vehicle 105 can then be optionally guided to one or more further target positions 155, as described above in greater detail. This is expressed in FIG. 3 by the broken line returning to step 345. A final target position can be the parking space 150. Optionally, the towing vehicle 165 can then be replaced with the drive system 160. The transportation vehicle 105 can subsequently leave the range of the control system 100, and enter a public roadway.

REFERENCE SYMBOLS 100 control system
105 transportation vehicle
110 barrier, access control system
115 control unit 120 sensor vehicle
125 flying sensor vehicle, e.g. multirotor helicopter, drone
130 ground sensor vehicle, e.g. automobile
135 standby position
140 sensor
145 communication system
150 parking space
155 loading ramp
160 drive system
165 towing vehicle
205 scanning range
300 method
305 arriving in depot, closed property
310 detecting transportation vehicle
315 can the drive system be controlled remotely?
320 can the drive system be decoupled?
325 end
330 decouple drive system
335 couple to towing vehicle
340 select sensor vehicle and control autonomously to transportation vehicle
345 determine target position; take other traffic, rules, etc. into account
350 autonomous control from all data sources
355 automatic loading/unloading

The invention claimed is:

1. A control system for a transportation vehicle comprising:
   a sensor vehicle that has at least one sensor configured to scan an environment and move autonomously to a detected transportation vehicle, wherein the sensor vehicle is configured to physically attach to the transportation vehicle autonomously; and
   a control unit configured to autonomously drive the transportation vehicle on the basis of sensor data from the at least one sensor.

2. The control system according to claim 1, further comprising:
   a parking space for parking the transportation vehicle, until the sensor vehicle reaches the transportation vehicle; and
   a target position, to which the transportation vehicle is autonomously driven to move.

3. The control system according to claim 1, wherein the transportation vehicle comprises at least one additional sensor configured to scan the environment, wherein the control system comprises an interface for connecting to the additional sensor, wherein the control unit is configured to autonomously drive the vehicle on the basis of sensor data from the additional sensor.

4. The control system according to claim 1, further comprising:
   a plurality of sensor vehicles, wherein each individual sensor vehicle of the plurality of sensor vehicles comprises at least one sensor,
   wherein the control unit is configured to autonomously drive the transportation vehicle on the basis of sensor data from the sensors of the plurality of sensor vehicles.

5. The control system according to claim 1, wherein the transportation vehicle comprises a drive system and an interface for transmitting control information to the drive system.

6. The control system according to claim 1, wherein the transportation vehicle does not have a drive, the control system further comprising a towing vehicle for moving the transportation vehicle, wherein the towing vehicle is configured to couple to the transportation vehicle autonomously.

7. The control system according to claim 1, wherein the sensor vehicle comprises an aircraft.

8. The control system according to claim 1, wherein the sensor vehicle comprises a land vehicle.

9. A method for autonomously driving a transportation vehicle comprising:
   detecting the transportation vehicle;
   moving a sensor vehicle to the transportation vehicle, wherein the sensor vehicle has at least one sensor for scanning an environment of the transportation vehicle, wherein the sensor vehicle is configured to autonomously move to the transportation vehicle;
   physically attaching the sensor vehicle to the transportation vehicle autonomously; and
   autonomously driving the transportation vehicle on the basis of sensor data from the at least one sensor.

10. The method according to claim 9, further comprising:
    autonomously driving the transportation vehicle to move from a parking space to a target position.

11. The method according to claim 9, further comprising:
    connecting to an additional sensor included with the transportation vehicle; and
    autonomously driving the transportation vehicle on the basis of sensor data from the additional sensor.

12. The method according to claim 9, further comprising:
    moving a plurality of sensor vehicles to the transportation vehicle, wherein each one of the plurality of sensor vehicles includes at least one sensor for scanning the environment of the transportation vehicle; and
    autonomously driving the transportation vehicle on the basis of sensor data from each of the at least one sensors of the plurality of sensor vehicles.

13. The method according to claim 9, further comprising:
    controlling a towing vehicle to couple to the transportation vehicle autonomously.

14. The method according to claim 9, wherein the sensor vehicle comprises an aircraft.

15. The method according to claim 9, wherein the sensor vehicle comprises a land vehicle.

* * * * *